United States Patent [19]

Kolts

[11] Patent Number: 5,071,818

[45] Date of Patent: Dec. 10, 1991

[54] PROCESS FOR PREPARATION OF TIN DIOXIDE CONTAINING CATALYST COMPOSITION

[75] Inventor: John H. Kolts, Bartlesville, Okla.

[73] Assignee: Phillips Petroleum Company, Bartlesville, Okla.

[21] Appl. No.: 673,044

[22] Filed: Mar. 21, 1991

[51] Int. Cl.$^5$ .......................... B01J 23/62; B01J 23/64
[52] U.S. Cl. ................................... 502/324; 502/310; 423/437
[58] Field of Search ................ 423/437; 502/308, 324, 502/310

[56] References Cited

U.S. PATENT DOCUMENTS

| | | | |
|---|---|---|---|
| 3,794,599 | 2/1974 | Dantzenberg et al. | 252/466 PT |
| 4,117,082 | 9/1978 | Matsuyama | 423/247 |
| 4,252,687 | 2/1981 | Dale et al. | 252/455 Z |
| 4,317,460 | 3/1982 | Dale et al. | 131/334 |
| 4,459,270 | 7/1984 | Leppard et al. | 423/248 |
| 4,490,482 | 12/1984 | Mathieu | 502/339 |
| 4,524,051 | 6/1985 | Wright et al. | 423/247 |
| 4,536,375 | 8/1985 | Holt et al. | 423/247 |
| 4,547,486 | 10/1985 | Shyr | 502/324 X |
| 4,639,432 | 1/1987 | Holt et al. | 502/324 |
| 4,830,844 | 5/1988 | Kolts | 423/437 |
| 4,991,181 | 2/1991 | Upchurch et al. | 502/324 X |

FOREIGN PATENT DOCUMENTS 2028571 3/1980 United Kingdom .

Primary Examiner—W. J. Shine
Assistant Examiner—D. J. McGinty
Attorney, Agent, or Firm—K. K. Brandes

[57] ABSTRACT

An improved process of preparing a composition, which is effective as a CO oxidation catalyst and contains (a) a $SnO_2$-coated porous ceramic material, (b) Pt and/or Pd and (c) at least one compound of Mn and/or Cr, requires the preparation of component (a) by impregnation of a porous ceramic material (preferably a monolith) with a tin carboxylate solution, followed by drying and calcining (so as to decompose tin carboxyte to tin dioxide).

15 Claims, No Drawings

PROCESS FOR PREPARATION OF TIN DIOXIDE CONTAINING CATALYST COMPOSITION

BACKGROUND OF THE INVENTION

This invention relates to a process for preparing a composition comprising a tin dioxide-coated porous ceramic support material and noble metal promoter(s), said composition being effective as a catalyst for the oxidation of carbon monoxide with free oxygen to carbon dioxide.

Catalyst compositions comprising a $SnO_2$-coated ceramic support material and promoters (such as Pd, Pt, Mn and Cr) are well known, and have been described in U.S. Pat. Nos. 4,524,051 and 4,830,844. The catalyst support material is generally prepared by dipping a ceramic material (preferably a monolith) into a colloidal dispersion of hydrated tin dioxide, followed by drying and calcining. This method requires the preparation of a colloidal dispersion of hydrated tin dioxide by a tedious, multi-step procedure, as has been described in the above-cited U.S. patents. The present invention is directed to a simplified method of preparing a $SnO_2$-coated porous ceramic material to be used as a support material for CO oxidation catalysts.

SUMMARY OF THE INVENTION

It is an object of this invention to prepare a composition of matter which comprises a $SnO_2$-coated porous ceramic material. It is a particular object of this invention to prepare a catalyst composition which is active for catalyzing the oxidation of CO with $O_2$ to $CO_2$. It is a further object of this invention to prepare a CO oxidation catalyst composition comprising a $SnO_2$-coated porous ceramic material, Pt and/or Pd promoter(s) and Mn and/or Cr copromoter(s).

According to this invention, in a process for preparing a composition of matter, which is active as a catalyst for the conversion of CO and $O_2$ to $CO_2$, comprising (a) a $SnO_2$-coated porous ceramic support material, (b) at least one noble metal promoter selected from the group consisting of palladium metal and platinum metal and (c) at least one copromoter selected from the group consisting of compounds of manganese and compounds of chromium, the improvement comprises preparing component (a) by a method comprising (i) impregnating a porous ceramic material with a solution of at least one tin carboxylate, (ii) substantially drying the obtained tin carboxylate-impregnated porous ceramic material, and (iii) heating the substantially dried, tin carboxylate-impregnated porous ceramic material under such conditions as to substantially convert said at least one tin carboxylate to tin dioxide.

In a preferred embodiment, the porous ceramic material is a monolith material. In another preferred embodiment, the at least one tin carboxylate is a tin(II) carboxylate (stannous carboxylate).

DETAILED DESCRIPTION OF THE INVENTION

Any suitable porous ceramic material can be used in the process of this invention, such as glass frits, honeycomb ceramic materials, and the like, preferably a monolith (commercially available from Corning Glass Works, Corning, N.Y., described in U.S. Pat. Nos. 4,388,277 and 4,524,051). A particularly preferred monolith has the general chemical formula of $2MgO \cdot 2Al_2O_3 \cdot 5SiO_2$. Generally, the monolith material is dried (e.g., at about 150°-200° C. for about 1-10 hours) before it is used in the process of this invention.

Any suitable tin carboxylate can be employed in the step of impregnating the porous ceramic material. Presently preferred are tin(II) mono- and dicarboxylates wherein the carboxylate group contains about 1 to 12 carbon atoms. Non-limiting examples of suitable tin(II) carboxylates are stannous formate, stannous acetate, stannous butyrate, stannous hexanoates, stannous octanoates (in particular stannous 2-ethylhexanoate), stannous decanoates, stannous dodecanoates, stannous oxalate, stannous cyclohexanecarboxylate, stannous benzoate, and the like, and mixtures of two or more thereof. Presently preferred are tin(II) carboxylates wherein the carboxylate group contains 6-10 (most preferably 8) carbon atoms.

Any suitable solvent can be used to prepare the tin carboxylate impregnating solution used in step (i). The choice of the solvent depends on the solubility of the tin carboxylate in the solvent, and on the stability of the formed tin carboxylate solution. Water can be employed as a solvent for those tin carboxylates which do not hydrolyze. Volatile organic solvents, preferably liquid hydrocarbons such as alkanes (e.g., n-hexane, n-heptane and the like), cycloalkanes (e.g., cyclopentane, cyclohexane, cycloheptane, methylcyclohexane and the like) and aromatic hydrocarbons (such as benzene, toluene, ethylbenzene, xylenes and the like), can also be employed, in particular for tin carboxytes with 6-10 carbon atoms per carboxylate group. Preferably, saturated solutions of tin carboxylate(s) are employed as impregnating solutions. Any suitable tin concentration in the impregnating solution can be employed. Generally, the tin concentration is in the range of about 1 to about 12 weight-% Sn.

The porous ceramic material can be impregnated with the tin carboxylate solution in any suitable manner, such as spraying of the solution onto the ceramic material, or immersing the ceramic material into the solution, or by mixing the ceramic material with a predetermined amount of the solution, and the like (generally at room temperature and 1 atm.). The weight ratio of the tin carboxylate solution to the porous ceramic material depends on the concentration of the solution and is chosen such as to provide a desired $SnO_2$ content in the finished $SnO_2$-coated ceramic material of about 1-50 weight-% $SnO_2$, preferably about 5-40 weight-% $SnO_2$.

Drying step (ii) can be carried out in any suitable manner. Generally, the material obtained in step (i) is heated at an elevated temperature and for such a period of time so as to substantially remove therefrom liquids (in particular the solvent of the impregnating solution used in the previous step). Generally, step (ii) is carried out in an inert or an oxidizing gas atmosphere (such as air), preferably at a temperature in the range of from about 30° C. to about 200° C. (more preferably about 80°-120° C.) for about 0.2 to about 20 hours, so as to substantially reduce the level of occluded or adhered liquid (such as water or hydrocarbon solvent), preferably to below about 10 weight-% liquid.

The substantially dried tin carboxylate-impregnated porous ceramic material obtained in step (ii) is then calcined in step (iii), preferably in a free oxygen containing atmosphere (such as air), so as to substantially convert the tin carboxylate to $SnO_2$. Generally the calcination conditions include a temperature in the range of from about 250° C. to about 400° C. (preferably about 280° C.-350° C.) and a calcination time of from about 0.1 to about 10 hours (preferably about 0.2-2 hours).

If a single impregnation step is not adequate to provide the desired $SnO_2$ weight percentage in the finished $SnO_2$-coated ceramic material, the impregnation step (i) and the subsequent heating steps (ii) and (iii) can be repeated as many times as needed, generally about 1-10 times.

The $SnO_2$-coated porous ceramic material is then impregnated with at least one noble metal compound of Pt and/or Pd and also at least one compound of Mn and/or Cr, as has been described in U.S. Pat. No. 4,830,844, the entire disclosure of which is herein incorporated by reference. Thereafter, the thus-impregnated $SnO_2$-coated ceramic support material is dried, calcined and reduced (with $H_2$ and/or CO), as has been described in U.S. Pat. No. 4,830,844. The finished (i.e., calcined and reduced) catalyst composition generally contains 0.5-10 (preferably about 1-5) weight-% Pt or Pd or (Pt+Pd), based on the weight of the catalyst material excluding the weight of the porous ceramic material. Compounds of Mn and/or Cr can be present in the catalyst composition at a level of about 0.1-3 (preferably about 0.2-1) weight-% Mn or Cr or (Mn+Cr), based on the weight of the catalyst material excluding the weight of the porous ceramic material.

The finished catalyst material is active as a catalyst for oxidizing CO with $O_2$ to $CO_2$, generally at a reaction temperature (i.e., the average temperature of the catalyst composition during the oxidation reaction) in the range of about $-50°$ C. to about 300° C., preferably in the range of about $-30°$ C. to about 200° C., more preferably at about 0°-100° C., most preferably at about 10°-40° C. Other pertinent CO oxidation conditions are disclosed in U.S. Pat. No. 4,830,844.

The following examples are presented to further illustrate this invention and are not to be construed as unduly limiting the scope of the claimed invention.

EXAMPLE I

This example illustrates the preparation of several Pt/Pd/Mn-promoted $SnO_2$-coated monolith catalyst materials. In the following preparations, a cylindrical piece of Celcor ® Cordierite #9475 monolith ceramic honeycomb material (provided by Corning Glass Work, Corning, N.Y.) having a diameter of about 1 inch and a height of about 1 inch, and containing 100 cells per square inch was used. The cordierite piece was washed with n-hexane and dried for 1 hour at 125° C. before it was used for the impregnation with tin compounds.

Support Material A was prepared by impregnating a dried Cordierite monolith (weighing 4.9 grams) with a solution of 3.5 g $SnCl_4.5H_2O$ in about 8 cc of distilled water. After the thus-impregnated monolith had been dried at 200° C. and calcined at 300° C. for 30 minutes, no coating remained on the monolith (because all $SnCl_4$ had evaporated). Therefore, Support Material A was useless for preparing a promoted catalyst comprising a $SnO_2$-coated monolith support.

Support Material B was prepared by impregnating a Cordierite monolith with tetrabutyltin. After drying and calcining, as described for Support Material A, all tetrabutyltin had evaporated. Thus, Support Material B was also useless for preparing a promoted catalyst comprising a $SnO_2$-coated monolith support.

Support Material C was prepared by impregnating a Cordierite monolith (weighing 4.9 grams) with a saturated solution of $SnSO_4$ in water. The thus-impregnated monolith was dried and calcined at 400° C. Thereafter, the impregnating, drying and calcining steps were repeated 8 times. The thus-impregnated monolith, which had gained 1.96 grams during the above-described procedure, was impregnated with concentrated $HNO_3$ and recalcined at 400° C. (for about 30 minutes).

Support Material D was impregnated with a solution of 30 weight-% stannous 2-ethylhexanoate (provided by M & T Chemicals Inc., a division of Atochem North America, Philadelphia, Pa.) in toluene. The thus-impregnated material was dried and calcined at 350° C. Thereafter, the impregnating, drying and calcining steps were repeated 7 times. The total weight gain of the thus prepared $SnO_2$-coated monolith was 2.4 grams.

Since Support Materials A and B did not contain any $SnO_2$ coating on the monolith, no Pt/Pd/Mn/$SnO_2$/-monolith catalysts could be prepared from these support materials. Only Support Material C and Support Material D, which contained a $SnO_2$ coating, could be employed for impregnation with compounds of Pt, Pd and Mn compounds, followed by drying, calcining and reducing with $H_2$, so as to prepare Pt/Pd/Mn/$SnO_2$/-monolith catalysts (for testing as low temperature CO oxidation catalysts).

Catalyst X (Control) was prepared by multiple impregnation of Support Material C with 2.54 grams of an aqueous 2.0 weight-% solution of tetrammine Pt(II) nitrate, 0.95 grams of an aqueous 5.17 weight-% solution of tetrammine Pd(II) nitrate and 0.27 grams of an aqueous 5.0 weight-% $Mn(NO_3)_2$ solution. After each impregnation, the impregnated material was dried in air at 125° C. and calcined in air at 300° C., and finally treated with hydrogen gas at 50° C. for 2 hours. Catalyst X contained 2.5 weight-% Pt, 2.5 weight-% Pd and 0.7 weight-% Mn, based on the catalyst excluding the weight of the Cordierite monolith (i.e., based on the weight of the $SnO_2$ coating which was 1.96 g).

Catalyst Y (Invention) was prepared in accordance with the procedure described for Catalyst X, except that Support Material D was used. Catalyst Y also contained 2.5 weight-% Pt, 2.5 weight-% Pd and 0.7 weight-% Mn, also based on the weight of the $SnO_2$ coating (which was 2.41 grams).

EXAMPLE II

This example illustrates the use of two above-described Pt/Pd/Mn-promoted, $SnO_2$-coated monolith catalysts (Catalysts X and Y, prepared from Support Materials C and D, described in Example I) for catalyzing the oxidation of carbon monoxide with free oxygen (so as to simulate the catalytic recombination of CO and $O_2$ in $CO_2$ lasers). As has been pointed out in Example I, no catalysts could be prepared from Support Materials A and B.

A gaseous feed blend of 1.2 volume-% CO, 0.6 volume-% $O_2$, 32 volume-% $CO_2$, 32 weight-% He, and $N_2$ as the balance was passed through a needle valve and a glass reactor in an upflow direction. The glass reactor tube had an inner diameter of about 2.6 cm and generally contained a round piece of catalyst of about 2.5 cm height and about 2.5 diameter. The temperature in the catalyst bed was measured by means of a thermocouple which was placed just above the catalyst piece. The CO content in the reactor effluent was determined by means of an Anarad Model AR400 IR analyzer. All tests were carried out at ambient conditions (about 25°-30° C).

The feed rate of the gaseous feed stream was about 400 cc/minute.

Catalyst X (Control), which had been treated with $H_2$ at 50° C. for 2 hours, was almost completely inactive as CO oxidation catalyst at the testing conditions: the CO conversion was only about 1% during a 2 hour test period.

Catalyst Y (Invention), which also had been treated with $H_2$ at 50° C. for 2 hours, gave the following CO conversions: 80–86% after 1 hour on stream, 68% after 2 hours on stream, 58% after 3 hours on stream, 54% after 4 hours on stream, and 53% after 5 hours on stream. These data correspond to CO conversions ranging from about 0.5 cc CO converted per gram catalyst per minute (after 1 hour on stream) to about 0.3 cc CO converted per gram catalyst per minute after 5 hours on stream. Thus, Catalyst Y containing a $SnO_2$-coated monolith which had been prepared by impregnation with a tin(II) carboxylate was much more active as a CO oxidation catalyst than Control Catalyst X (prepared with tin sulfate in lieu of tin carboxylate).

Catalyst Y was approximately as active as a Pt/Pd/Mn/$SnO_2$/monolith catalyst disclosed in Example II (Catalyst D) of U.S. Pat. No. 4,830,844. The $SnO_2$-coated monolith support of the catalysts disclosed in U.S. Pat. No. 4,830,844 was prepared by dipping the monolith into a colloidal dispersion of tin dioxide (followed by drying and calcining). This method requires the tedious preparation of a colloidal tin dioxide solution by a multi-step process (described in Example II of U.S. Pat. No. 4,830,844), while the preparation process of the present invention requires only a simple one-step method (namely dissolving a tin carboxylate in a suitable solvent). Based on the comparison of the test data contained in this application and in U.S. Pat. No. 4,830,844, it is concluded that catalysts (comprising Pt and/or Pd metal and Mn and/or Cr compounds) prepared in accordance with the process of the present invention are as effective as but much more easily prepared than the corresponding catalysts disclosed in U.S. Pat. No. 4,830,844.

Reasonable variations, modifications and adaptations for various usages and conditions can be made within the scope of the disclosure and the appended claims, without departing from the scope of this invention.

That which is claimed is:

1. In a process for preparing a composition of matter, which is effective as a catalyst for the oxidation of carbon monoxide with free oxygen to carbon dioxide, comprising (a) a $SnO_2$-coated porous ceramic support material, (b) at least one noble metal selected from the group consisting of platinum and palladium, and (c) at least one compound selected from the group consisting of manganese compounds and chromium compounds, the improvement which comprises preparing component (a) by a method comprising (i) impregnating a porous ceramic material with a solution of at least one tin carboxylate, (ii) substantially drying the thus-obtained tin carboxylate-impregnated porous ceramic material, and (iii) heating the substantially dried, tin carboxylate-impregnated porous ceramic material under such conditions as to substantially convert said at least one tin carboxylate to tin dioxide.

2. A process in accordance with claim 1, wherein said at least one tin carboxylate has 1–12 carbon atoms per carboxylate group.

3. A process in accordance with claim 2, wherein said at least one tin carboxylate is at least one tin(II) carboxylate.

4. A process in accordance with claim 3, wherein said at least one tin(II) carboxylate has 6–10 carbon atoms per carboxylate group.

5. A process in accordance with claim 1, wherein said at least one porous ceramic material is a monolith.

6. A process in accordance with claim 1, wherein said at least one porous ceramic material is a monolith, said solution of at least one tin carboxylate is a solution of at least one tin(II) carboxylate with 6–10 carbon atoms per carboxylate.

7. A process in accordance with claim 6, wherein said solution of at least one tin(II) carboxylate contains a hydrocarbon solvent.

8. A process in accordance with claim 7, wherein said solution of at least one tin(II) carboxylate is a solution of tin(II) 2-ethylhexanoate in toluene.

9. A process in accordance with claim 7, wherein said solution of at least one tin(II) carboxylate contains about 1–12 weight-% tin.

10. A process in accordance with claim 1, wherein drying step (ii) is carried out at a temperature of about 30°–200° C. for a time period of about 0.2–20 hours.

11. A process in accordance with claim 1, wherein heating step (iii) is carried out in an oxidizing atmosphere at a temperature of about 250°–400° C. for a time period of about 0.1–10 hours.

12. A process in accordance with claim 1, wherein steps (i), (ii) and (iii) are repeated at least once.

13. A process in accordance with claim 1, wherein the tin dioxide-coated material obtained in step (iii) contains about 1–50 weight-% $SnO_2$.

14. A process in accordance with claim 13, wherein the porous ceramic material in said tin dioxide-coated material is a monolith.

15. A process in accordance with claim 1, wherein said composition of matter comprises (a) a $SnO_2$-coated monolith, (b) platinum metal and paloladium metal, and (c) at least one manganese compound.

* * * * *